(12) United States Patent
Kasunic et al.

(10) Patent No.: US 8,937,639 B2
(45) Date of Patent: Jan. 20, 2015

(54) INTERLACED FOCAL PLANE ARRAY FOR WIDE-AREA SURVEILLANCE

(75) Inventors: Keith J. Kasunic, Winter Garden, FL (US); Mark Goodnough, Santa Barbara, CA (US); John G. Donohue, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 765 days.

(21) Appl. No.: 13/249,104

(22) Filed: Sep. 29, 2011

(65) Prior Publication Data

US 2012/0081511 A1   Apr. 5, 2012

Related U.S. Application Data

(60) Provisional application No. 61/387,803, filed on Sep. 29, 2010.

(51) Int. Cl.
| | |
|---|---|
| *H04N 7/00* | (2011.01) |
| *H04N 5/33* | (2006.01) |
| *H04N 5/232* | (2006.01) |
| *H04N 5/262* | (2006.01) |

(52) U.S. Cl.
CPC ............ *H04N 5/33* (2013.01); *H04N 5/23238* (2013.01); *H04N 5/2624* (2013.01)
USPC ............................................. 348/36; 348/294

(58) Field of Classification Search
USPC .................................. 348/36, 294; 250/208.1
See application file for complete search history.

(56) References Cited

U.S. PATENT DOCUMENTS

| | | | |
|---|---|---|---|
| 7,687,871 B2 | 3/2010 | Maimon | |
| 8,463,078 B2 | 6/2013 | Goodnough et al. | |
| 2003/0193589 A1* | 10/2003 | Lareau et al. | 348/294 |
| 2010/0046853 A1 | 2/2010 | Goodnough et al. | |

\* cited by examiner

*Primary Examiner* — Sath V Perungavoor
*Assistant Examiner* — Nathnael Aynalem
(74) *Attorney, Agent, or Firm* — Withrow & Terranova, PLLC

(57) ABSTRACT

Systems and methods of acquiring large field of view, high-resolution image data are discussed herein. Techniques and devices relate operation and composition of systems for acquiring large field of view, high-resolution image data. Such systems may include a first sensor chip assembly (SCA) in an interlaced focal plane array (FPA), the first SCA having a length, a width, and a resolution; a second SCA in the FPA, the second SCA having the same length, width, and resolution; and a field of view (FOV) adjustment device that moves the FOV of the FPA so that it can observe different scenes. In some such systems, the first and second SCAs are arranged relative to each-other in a first spaced array extending along a first dimension of the FPA such that there is an intentional gap between the first and second FPAs along the first dimension.

26 Claims, 16 Drawing Sheets

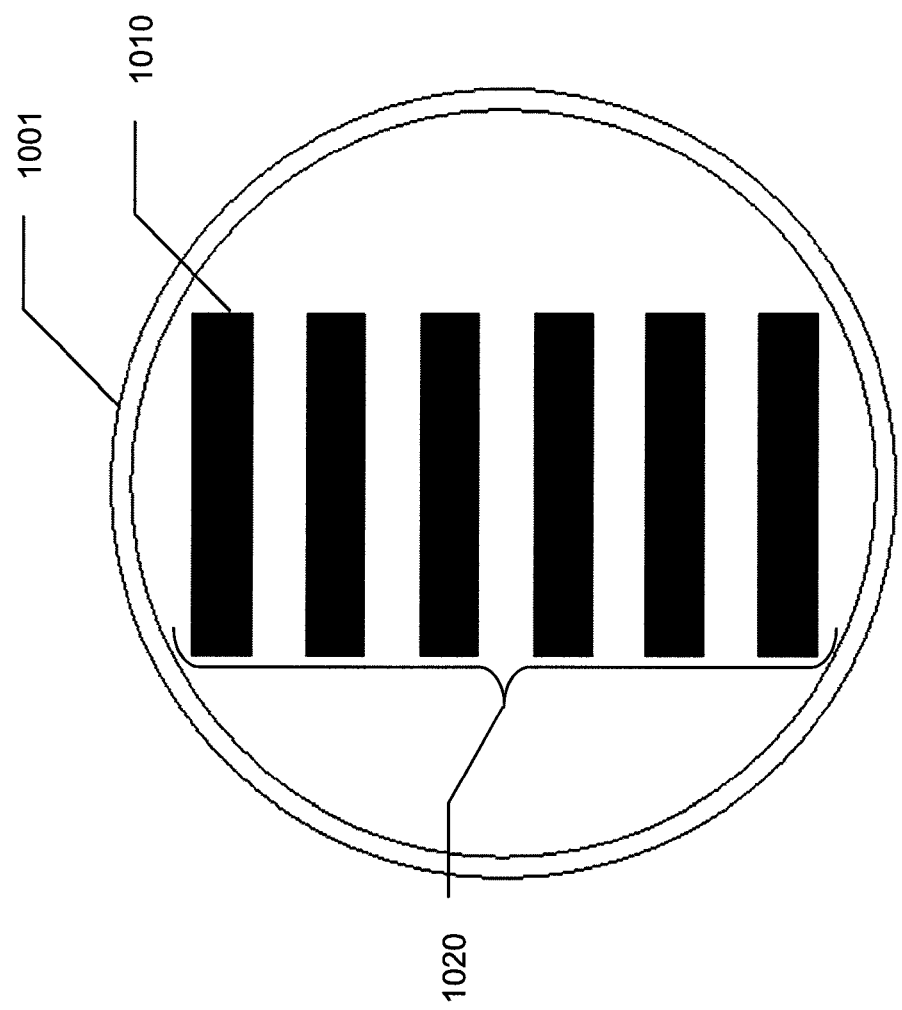

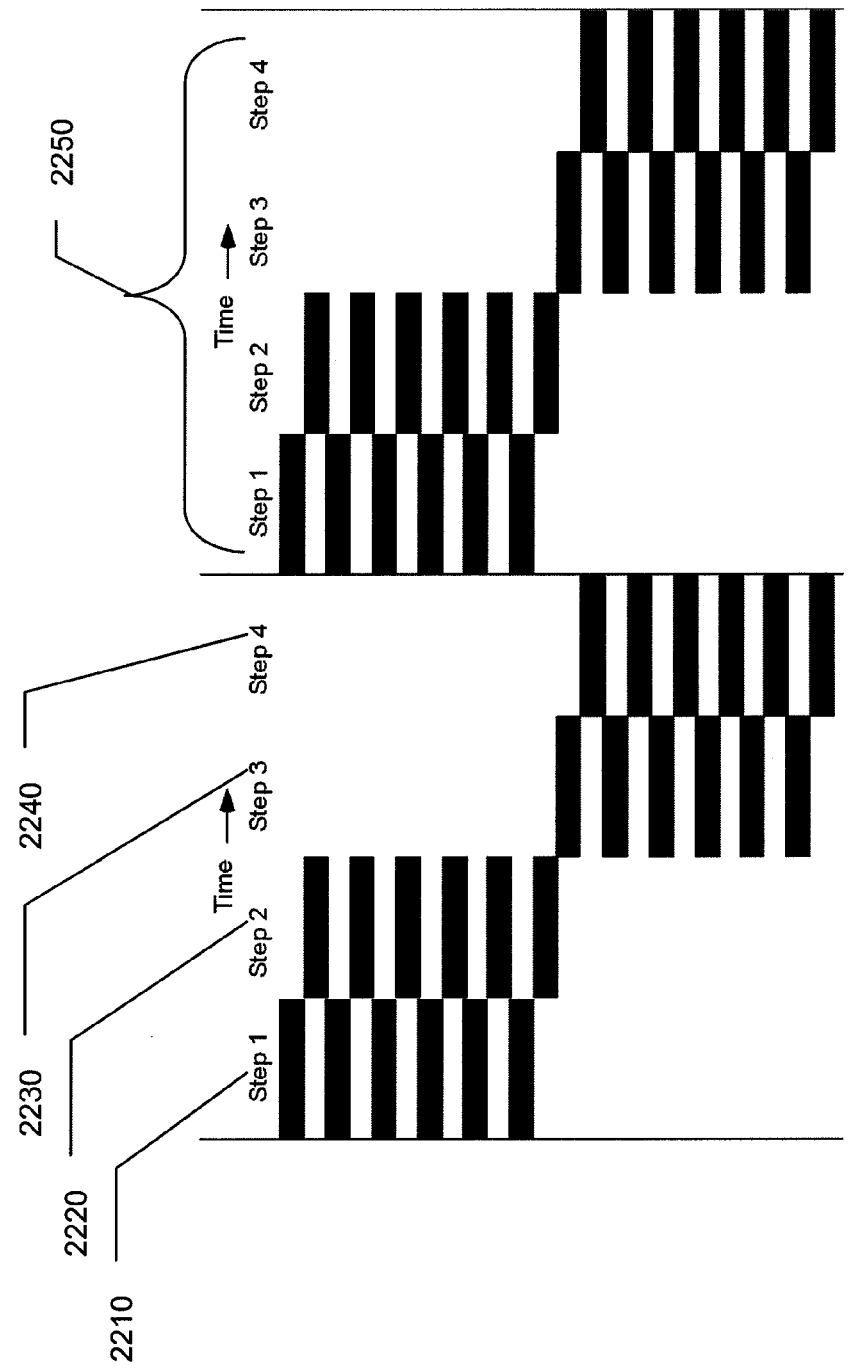

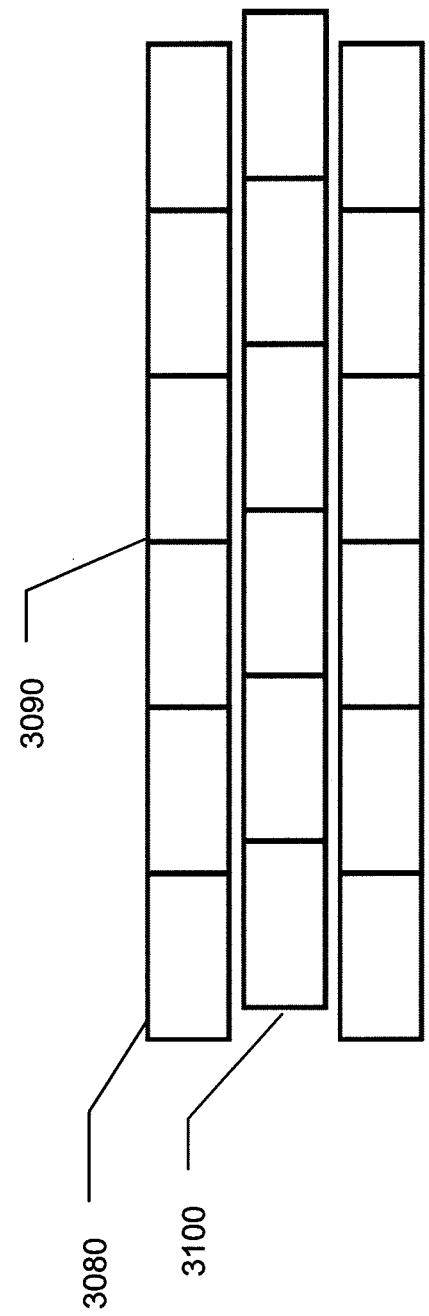

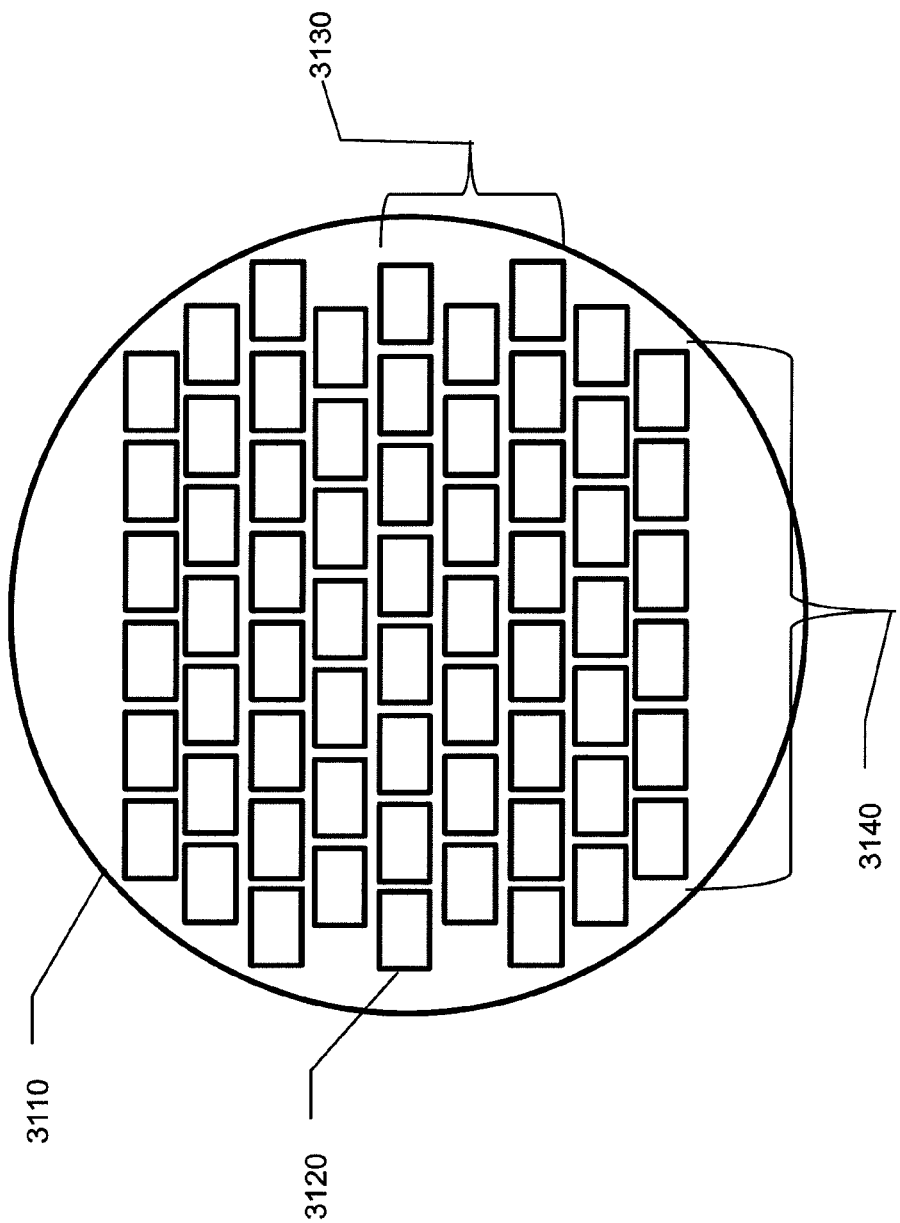

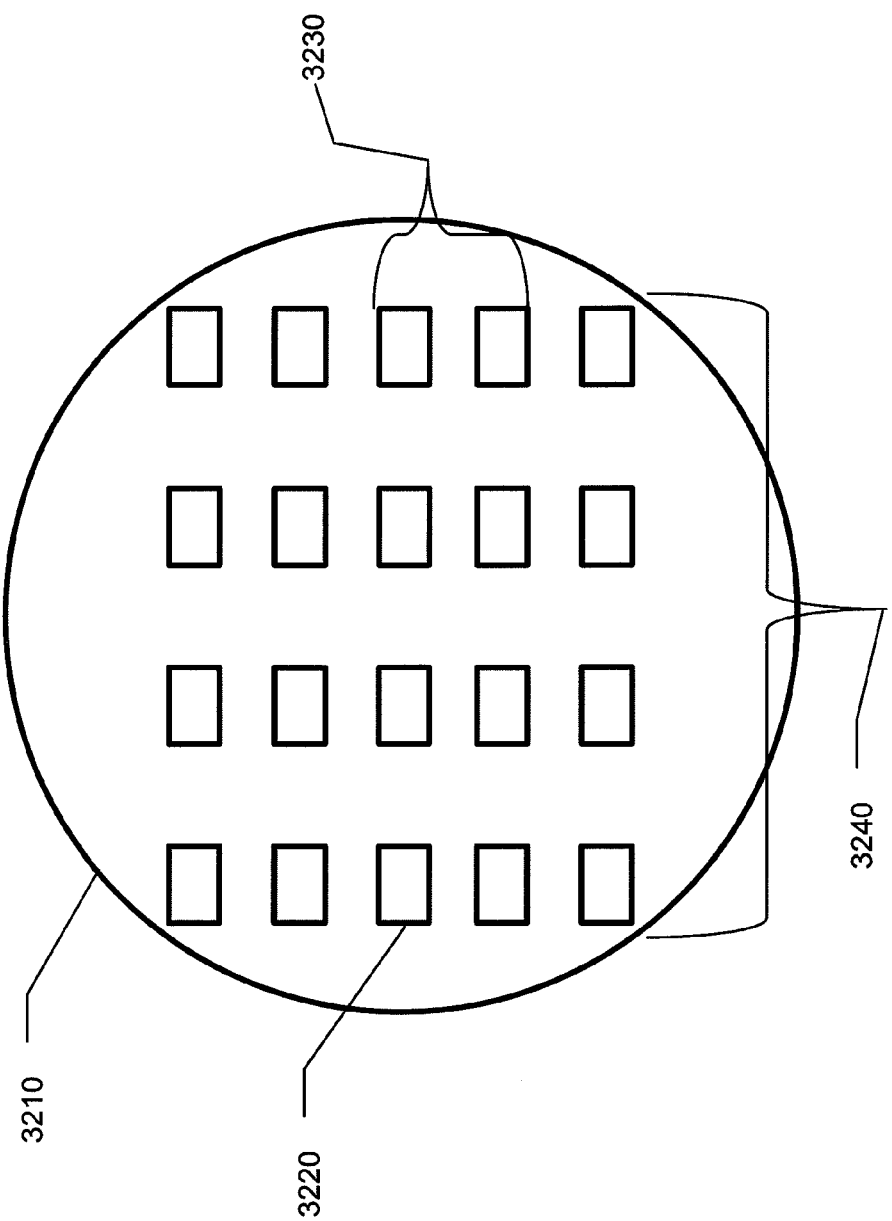

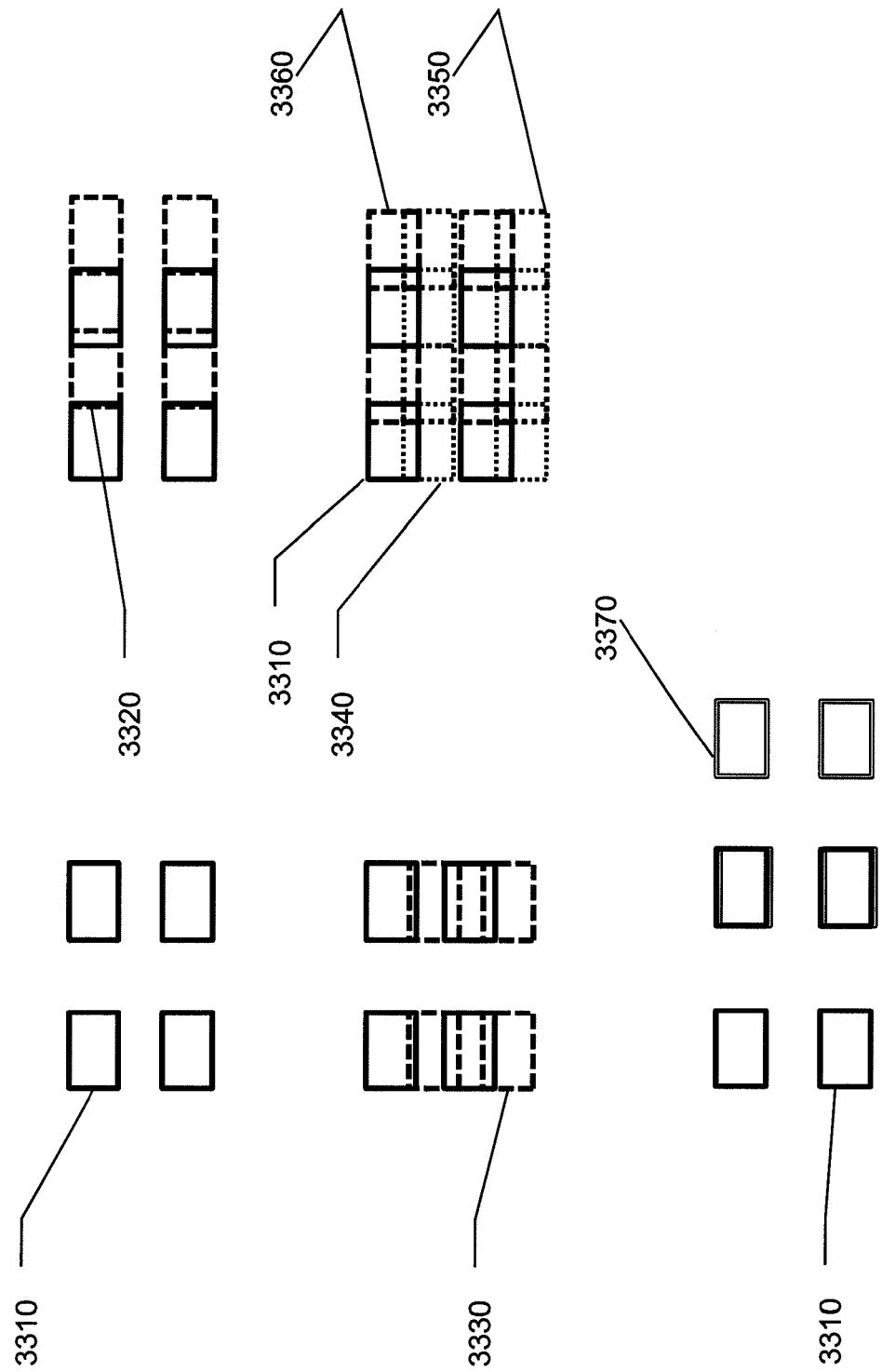

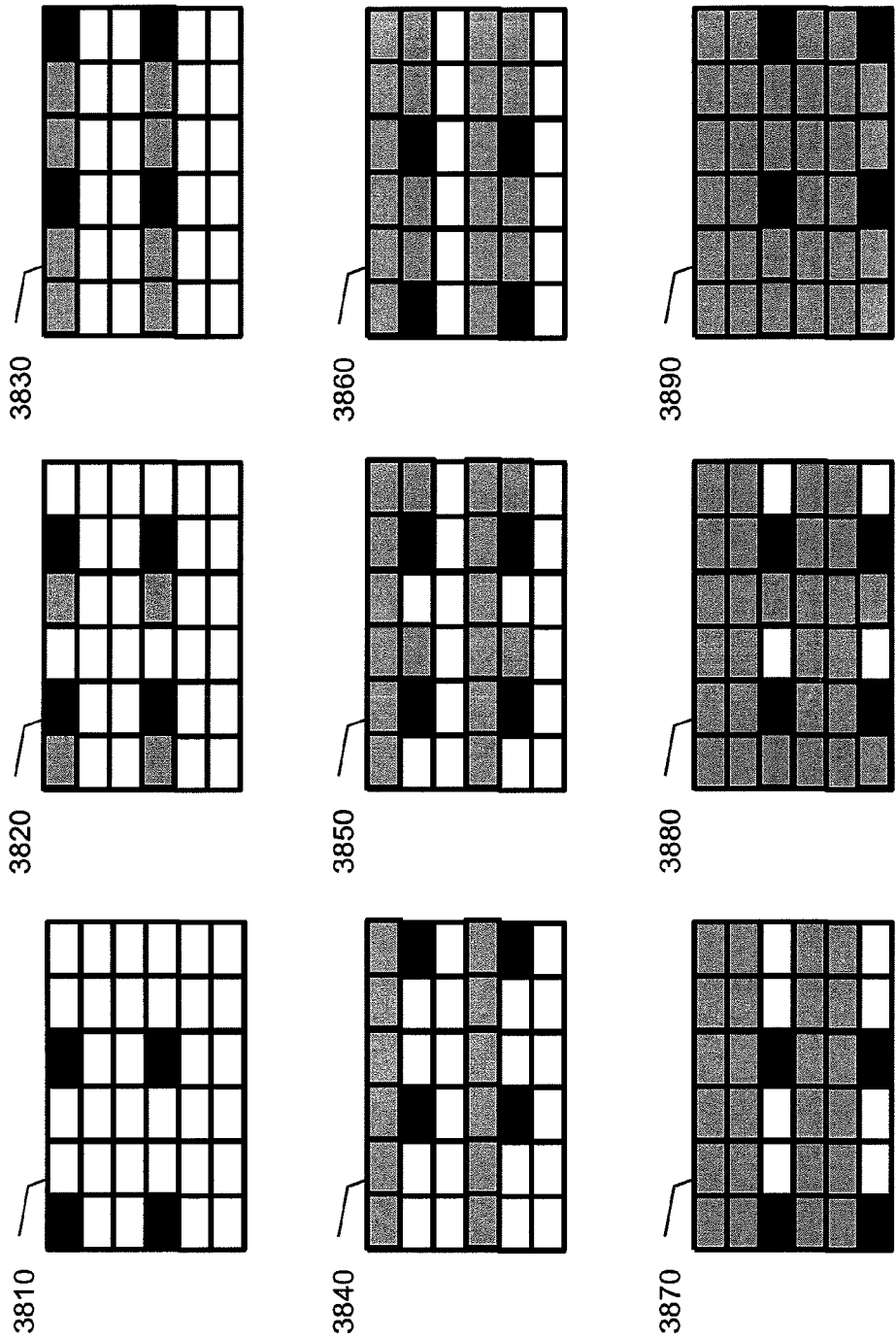

INTERLACED FOCAL PLANE ARRAY FOR WIDE-AREA SURVEILLANCE

PRIORITY

The present application claims benefit of priority from U.S. Provisional Application 61/387,803, filed in the United States Patent and Trademark Office on Sep. 29, 2010, the entire contents of which are hereby incorporated by reference.

BACKGROUND

In the area of visual/optical surveillance, one of the primary objectives is to efficiently scan a wide area of coverage, with sufficiently high resolution to enable detection, recognition, and identification of objects from airborne and/or elevated surveillance platforms. Prior attempts to address this issue focused on solutions such as continuous scan TDI (Time Delay & Integration) systems, large, monolithic focal plane arrays (FPAs), and two-axis scan mirrors to allow for a greater range of view.

Continuous scan TDI systems cannot cover a large area with good resolution and/or ground sample distance (GSD) and quick revisit rates. Large, monolithic FPAs or buttable FPAs are expensive and difficult to produce in sufficient size/quantity and have limited ground coverage areas. Two-axis scan mirrors are slow, expensive, and prone to failure and/or alignment problems.

SUMMARY

A multiplicity of smaller staring Sensor Chip Assemblies (SCAs) can be arranged into a larger multi-SCA Focal Plane Array to overcome the scaling problem of extending staring FPA technology for extremely high resolution systems. In conventional approaches involving extremely large SCA, it is difficult accomplish close-butting of SCAs to effectively form a large continuous-image staring FPA. Also fast 2-dimensional step-staring approaches of smaller single SCAs do not scale effectively for such systems. Furthermore, they are difficult to manufacture in the desired size/scale. Here the multiple SCAs are not close butted but spaced apart so that their images overlap when stepped, creating an effective large array. Related techniques and technologies in this field of endeavor are discussed in U.S. patent application Ser. No. 12/230,100, filed on Aug. 22, 2008, the entire contents of which are hereby incorporated by reference.

Further scope of applicability of the methods and systems described herein will become apparent from the detailed description given hereinafter. However, it should be understood that the detailed description and specific examples, while indicating preferred variations, are given by way of illustration only, since various changes and modifications within the spirit and scope of the overall concepts will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 1a depicts an embodiment of a variation of a monolithic FPA replacement solution as described herein;

FIG. 2d depicts another example of a step-stare imaging approach as described herein;

FIG. 3b depicts another embodiment of a variation of a monolithic FPA replacement solution as described herein;

FIG. 3c depicts another embodiment of a variation of a monolithic FPA replacement solution as described herein;

FIG. 3d depicts another embodiment of a variation of a monolithic FPA replacement solution as described herein;

FIG. 3e depicts another example of a step-stare imaging approach as described herein;

FIG. 3h depicts another example of a step-stare imaging approach as described herein.

Figure 1B:
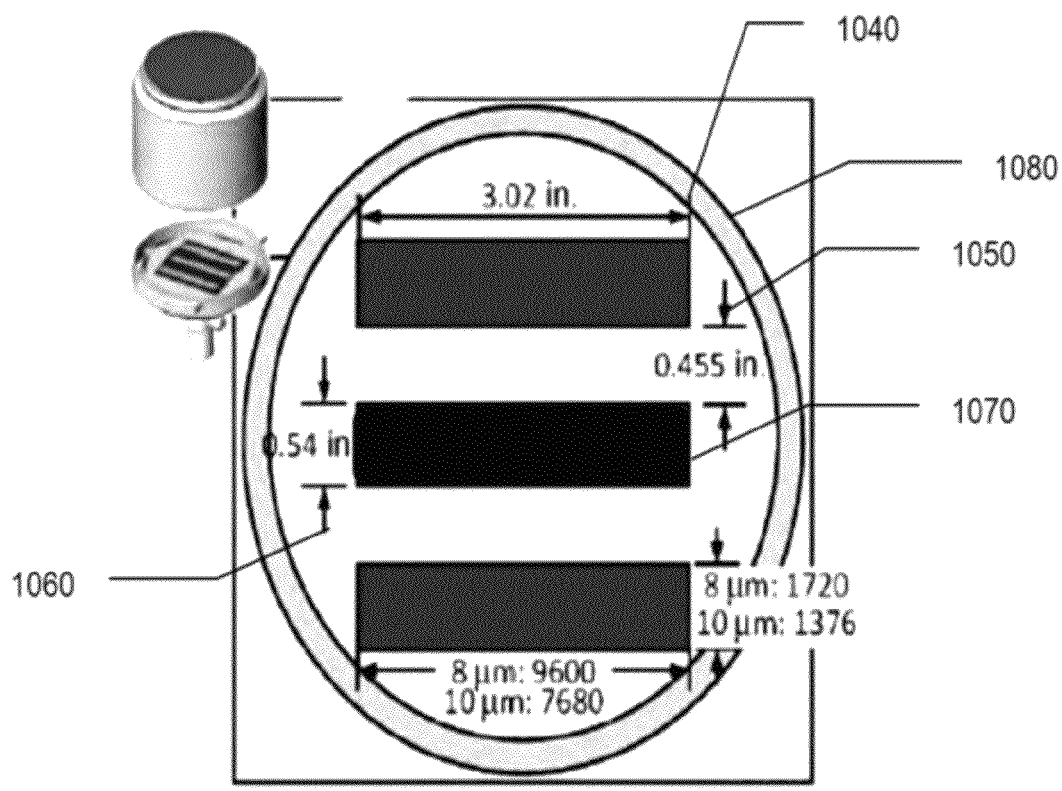
FIG. 1b depicts another embodiment of a variation of a monolithic FPA replacement solution as described herein.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed herein. Instead, the scopes of the methods and systems disclosed herein are defined by the appended claims and equivalents thereof.

A new approach to address the issue of high-resolution, wide-area coverage employs a single-axis scan mirror with interlaced (or "segmented") focal-plane arrays (FPAs). Variations of the FPAs can be wide enough to cover the field-of-view (FOV) in one dimension or can be extended further with multiple cameras.

To cover the second dimension, monolithic FPAs can be replaced with lower-cost interlaced multi-SCA FPAs and a single-axis scanning mirror. In some variations, the wide SCAs can also be segmented, requiring a small overlap between neighboring pixels. In further variations, the SCAs may be include nBn FPAs type detectors of the type discussed in U.S. Pat. No. 7,687,871 granted to Shimon Maimon on Mar. 30, 2010, the entire contents of which are hereby incorporated by reference.

A variation of an overall device may include a compact cooler, a series of segmented arrays in a dewar, conventional optics of an appropriate focal-length to produce the desired GSD, and a rapid-stepping one-axis mirror.

Other configuration and overall device type variations may be employed depending on desired resolution, scanning speed, overall coverage area, power consumption, weight, and operating environment considerations. Some variations may use different forms of cooling such as rechargeable or replaceable total-loss cooling systems. Further variations may use two, four, or more multi-SCA FPAs or may use staggered or partially overlapping multi-SCA FPA arrangements. Yet further variations may use a mirror having different stepping characteristics, or one with continuous and smooth range of motion. One particular variant may combine a fast large-step actuator or motor and a fast small-step actuator or motor such that large and small steps alternate. In one particular approach, an initial small step in a first direction may be accomplished with a fast-moving toggle device such that a subsequent small step will be in the other direction on the axis.

For use in moving vehicle systems (e.g. satellites), an alternate variation is to use the scan mirror with a small step to fill in the gaps between the SCAs in a multi-SCA FPA making a dual-step-composite image and allow for vehicle motion to scan this composite frame-stepping assembly over a continuous swath of ground surface.

Yet further variations may involve rotating the entire imaging assembly or mechanically shifting the relative positions of the SCAs to fill gaps in the image. Yet further variations may use a combination of vehicle motion and sampling rate (either pre-configured or dynamically adjusted) to fill gaps in the image data.

Image capture in a variation of an FPA system of the type discussed herein may operate by combining image data across vertically-interlaced time slots to produce a scanned frame having an area coverage many times greater than the area coverage than device's pixel count could normally achieve. For example, a device having four segmented FPAs made up of four interlaced SCAs that performs image capture over six time slots will generate a scanned frame at 6 times the area coverage of the dewar itself.

In some the embodiments, the gap sizes and mirror step sizes are chosen to allow adjacent image regions to be overlapped to some extent (usually 5 to 10%, but sometimes over 90%) to compensate for lens distortion, line-of-site movement between steps, and other effects that may prevent or impede perfect alignment of the pixels between steps. The individual images from each step in such overlapping embodiments may then be aligned to fractional pixel accuracy by warping the images to align together. These "warping" or "stitching" parameters can be based on real-time, image-based features detected within the overlap regions of adjacent sub-images or by a one-time calibration of sub-image-stitching parameters with image calibration instruments.

The resolution and coverage area improvements may also be combined with significant cost savings. In a variation using 6 SCAs, each having a 10 micron pitch, with an (approximately) SCA-sized gap between the SCAs in the spaced array, with 4 similar dewars arranged horizontally and each stepped 4 times vertically, a 600+ megapixel image can be produced.

Variations of such a solution may produce varying types of image output depending on factors such as integration time and image frame rate. Integration times may range from 0.1 to over 30 ms and frame rates may range from 10 to 60 Hz, but higher or lower integration times and frame rates may be employed.

In one embodiment, each spaced array may be made of 6×8.5 Mpix (1200×7100 pixel array) SCAs. Comparable performance from a staring or butted FPA solution would require an array of at least two 20 Mpix staring FPAs with a 2-dimensional step pattern costing much more than the 6 SCAs due to their exponentially lower yields of very large FPAs.

Furthermore, each large SCA in a spaced array may itself instead be an interlaced array FPA made up of yet smaller SCAs. In some variations, each FPA in a spaced array may be made of a series of small SCAs placed next to each-other. In one variant, similarly-sized smaller SCAs may be arranged into a strip-type array.

Each SCA in such an arrangement may be an inexpensive, low-resolution and/or low-cost device that is interlaced or otherwise configured to work in conjunction with the other SCAs in the array, and the composite strip FPA is then configured to work with other strip FPAs (composite or not) in the spaced array.

In one variation of a monolithic FPA replacement solution, shown in FIG. 1a, a dewar or other cooling/containment unit 1001 that would otherwise hold a monolithic, high-resolution FPA may be equipped with an array 1020 of interlaced lower-resolution SCAs (or in some variations, FPAs themselves made of yet smaller interlaced SCAs) 1010. Because the SCAs are interlaced, they may be implemented with a common-read out circuit and/or with inter-connected or otherwise shared read-out components. The interlaced FPA array 1020 may be paired with a single-axis scanning mirror (not shown).

In one particular such arrangement, shown in FIG. 1b, an array of SCAs 1070 having either 8 micron or 10 micron pixels may replace a monolithic FPA otherwise disposed inside a dewar flange 1080. Three such SCAs 1070, each being approximately 3 inches across 1040 and half an inch high 1060 may replace a 20 mega-pixel staring FPA. In some variations, the SCAs 1070 may have a common read-out circuit or with inter-connected or otherwise shared red-out components. In other variations, each FPA may be read out separately (either sequentially or simultaneously) and the images from each FPA may be "stitched" together in a downstream hardware or software system (or combination thereof) to create a composite image of the entire scene.

Figure 2A:
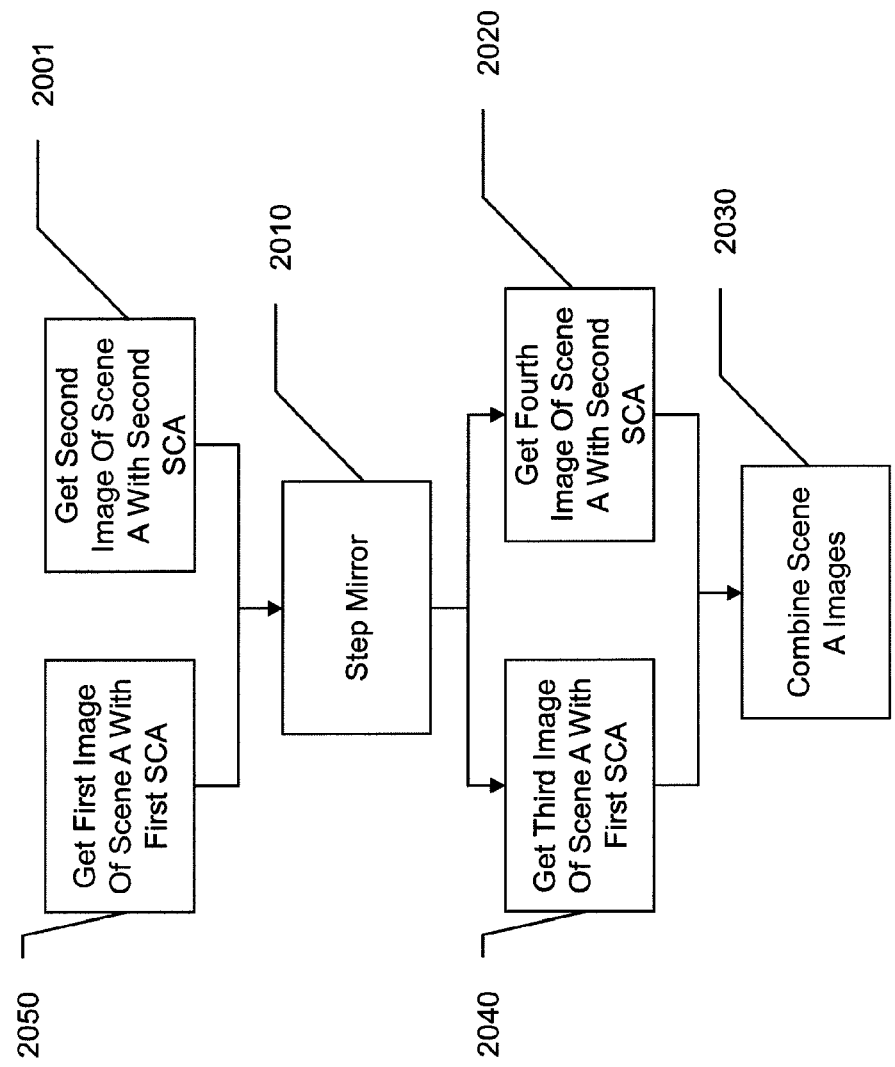
FIG. 2a depicts an example of a step-stare imaging approach as described herein.

Such an arrangement allows for step-stare scanning similar to what a monolithic FPA could accomplish by adding a small mirror step between large mirror steps so that a given scene is imaged twice in order to fill gaps in the detection array 1020. An example of a step-stare imaging approach to capture a scene is shown in FIG. 2a. In the approach shown, a first SCA in an array captures a first image for a first scene 2050. At the same time, a second SCA in the array captures a second image for the first scene 2001. The scanning mirror is then stepped 2010 while the first two images of scene A are read-out, and the first and second SCAs of the array capture third and fourth images of scene A 2020, 2040 after the mirror is stepped. The third and fourth images are then combined 2030 or "painted in" to the gaps between the first and second images to form a cohesive image of the scene.

Figure 1C:
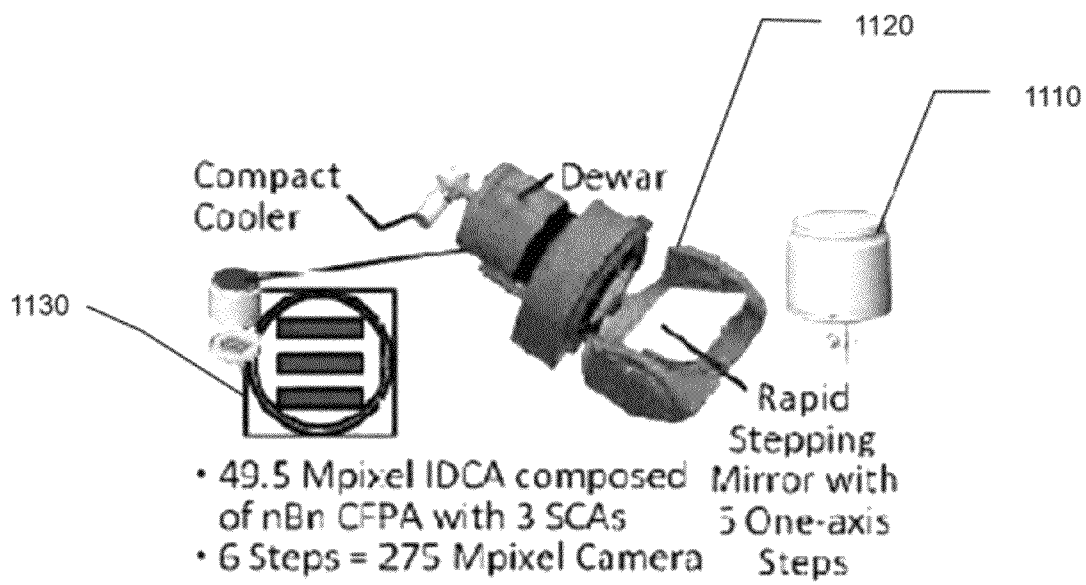
FIG. 1c depicts another embodiment of a variation of a monolithic FPA replacement solution as described herein.

FIG. 1c shows a variation of an FPA array disposed in a dewar and mated to a single-axis mirror. As can be seen in the figure, the FPA array 1130 is disposed inside a dewar assembly 1110 that is connected to a compact cooler. The optical aperture of the dewar is then aimed down towards a single-axis mirror 1120. In the embodiment shown, the mirror 1120 is a rapid stepping mirror with 5 one-axis steps. Other variations may use a continuous-drive mirror or may use a mirror with more or fewer steps. Variations employing a continuous-drive mirror may allow for faster collection of the image. In other variations, the number of steps may be determined by the field-of-regard (FOR) to be covered, the field-of-view (FOV) of each SCA, and the time needed to collect the image for each SCA.

Figure 2B:
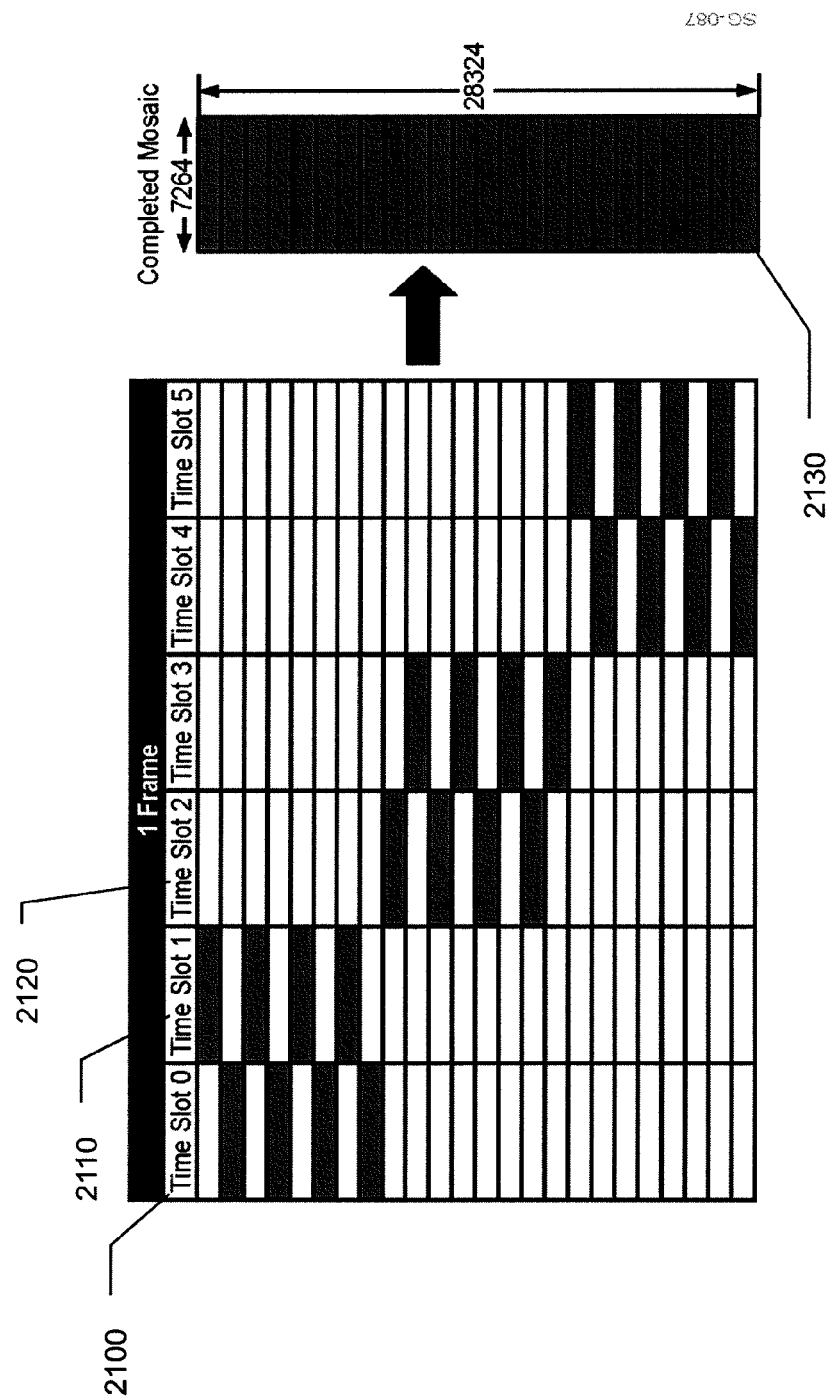
FIG. 2b depicts another example of a step-stare imaging approach as described herein.

FIG. 2b illustrates the step-stare approach with an interlaced FPA over time. In the first time slot 2100, an initial set of images is captured by the interlaced FPA. The scanning mirror is then stepped a small amount to move the array so that it covers those scene portions missing from the first time slot image 2100. The second time slot image 2110 then "fills in" the missing scene portion. The scanning mirror is then stepped a large amount to an entirely new scene portion 2120 where the process of image capture, small step, and image capture is repeated. Eventually, completed mosaic image 2130 may be output as a single frame of video based on the scene portions captured and combined from the interlaced FPA array over a series of step-stare operations.

Figure 2C:
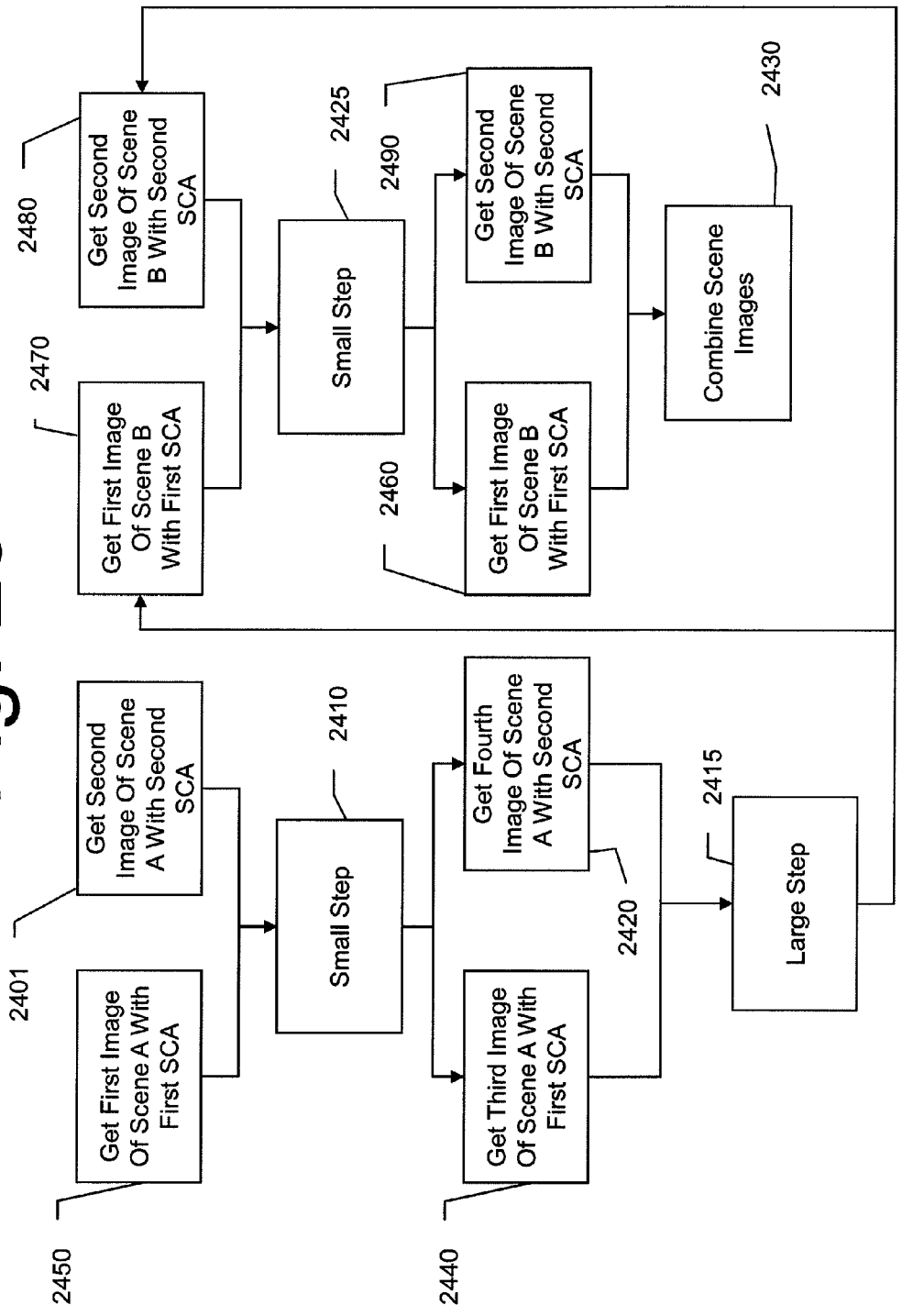
FIG. 2c depicts another example of a step-stare imaging approach as described herein.

An example of a step-stare imaging approach with different step sizes to capture and combine multiple scenes is shown in FIG. 2c. In the variation shown, a first SCA in a first array captures a first image for a first scene 2450. At the same time, a second SCA in the first array captures a second image for the first scene 2401.

The scanning mirror is then incrementally stepped 2410 while the images the first and second scenes are read-out, and the first and second SCAs of the first array capture third and fourth images of the first scene 2440, 2420 after the mirror is incrementally stepped 2410. The third and fourth images of the first scene may be "painted in" to the gaps left by the first and second images of the first scene as described with respect to FIG. 2b. After the third and fourth images of the first scene are acquired, the scanning mirror is stepped a larger amount 2415 to observe a new scene.

As with the first scene, the first and second SCAs of the array FPA acquire first and second images 2470 2480 of the second scene. The mirror is then incrementally stepped 2425 and the SCAs capture third and fourth 2460 2490 images of the second scene. The third and fourth images of the second scene may be "painted in" to the gaps left by the first and second images of the second scene as described with respect to FIG. 2b. The painted-in images may then be combined 2430 to form a composite image of the overall scene. In some variations, the painting-in aspects may be part of the overall scene image combination 2430 process.

The variation in FIG. 2b relates to a single array FPA stepped through a series of image capture operations. The variation in FIG. 2d depicts an image capture process associated with multiple array FPAs performing simultaneous step-stare operations in conjunction with a shared reflective element or with commonly controlled reflective elements. In some variations, the reflective element may be a single-axis scanning mirror large enough to accommodate two (or more) dewars, each containing an interlaced array FPA as described herein. In other variations, the reflective element may be sized to only accommodate a single dewar. In yet other variations, the reflective element may be replaced by a refractive scanning element such as, for example, a Risley scanner. In even further variations, a reflective element may be omitted entirely and the array FPA(s) or dewar(s) may be mounted on or associated with an articulated platform such that the FPA(s) directly observe(s) a scene.

In the variation shown, an array FPA takes an initial image at a first scene portion 2210, then incrementally steps the FOV of the array FPA to take a fill-in image of a second portion 2220, and then makes a larger adjustment to the FOV of the array FPA to take an initial 2230 and incrementally stepped fill-in image 2240 again. The second array FPA performs the exact same series of steps 2250 and its image data may be simultaneously read-out and integrated with the image data from the first array FPA. In one variation, each SCA of the array FPAs may be read out independently, with images from each SCA assembled/combined in a downstream software or hardware system to create a composite image of the entire scene. The number of overlapping pixels may be determined by the scan-mirror step angles (and dewar alignments in multiple dewar configurations). In some variations, the overlapping pixels may be determined in hardware to increase operating speed and reduce computational load.

In yet further variations, a FOV-adjustment or FOV-moving element like a mirror or a refractive element may be coupled with an articulated platform that enables motion in at least one additional axis. Some variations may combines one or more array FPAs, equipped with one or more single-axis mirrors, with a gimbaled platform that moves the mirrors in multiple degrees of freedom, including rotation around an axis perpendicular to the mirrors' axis of rotation. One such variation is depicted in FIG. 2e.

Figure 2E:
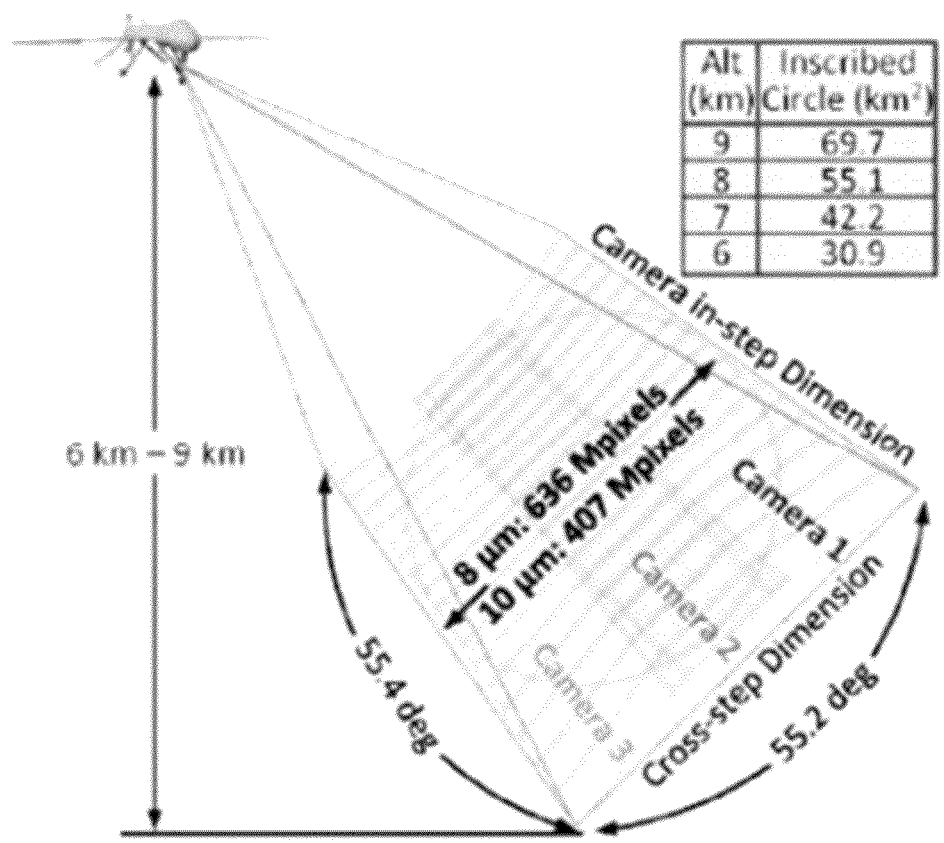
FIG. 2e depicts another example of a step-stare imaging approach as described herein.

FIG. 2e shows a step-stare imaging pattern for a multi-camera and/or multi-FPA array imaging solution deployed in an aircraft. In the embodiment shown, three cameras, each having at least one array FPA as described herein, are either operated from a shared single-axis mirror or from three synchronized/commonly actuated mirrors. The stepping pattern and/or rotational range of the mirror(s), combined with the number and arrangement of cameras, can then determine an overall imaging field of regard that can be acquired within a particular time period. Also, as shown, increases in distance from an imaged scene (caused by changes in altitude in the case of an airplane) cause a larger scene area to be imaged.

Figure 3A:
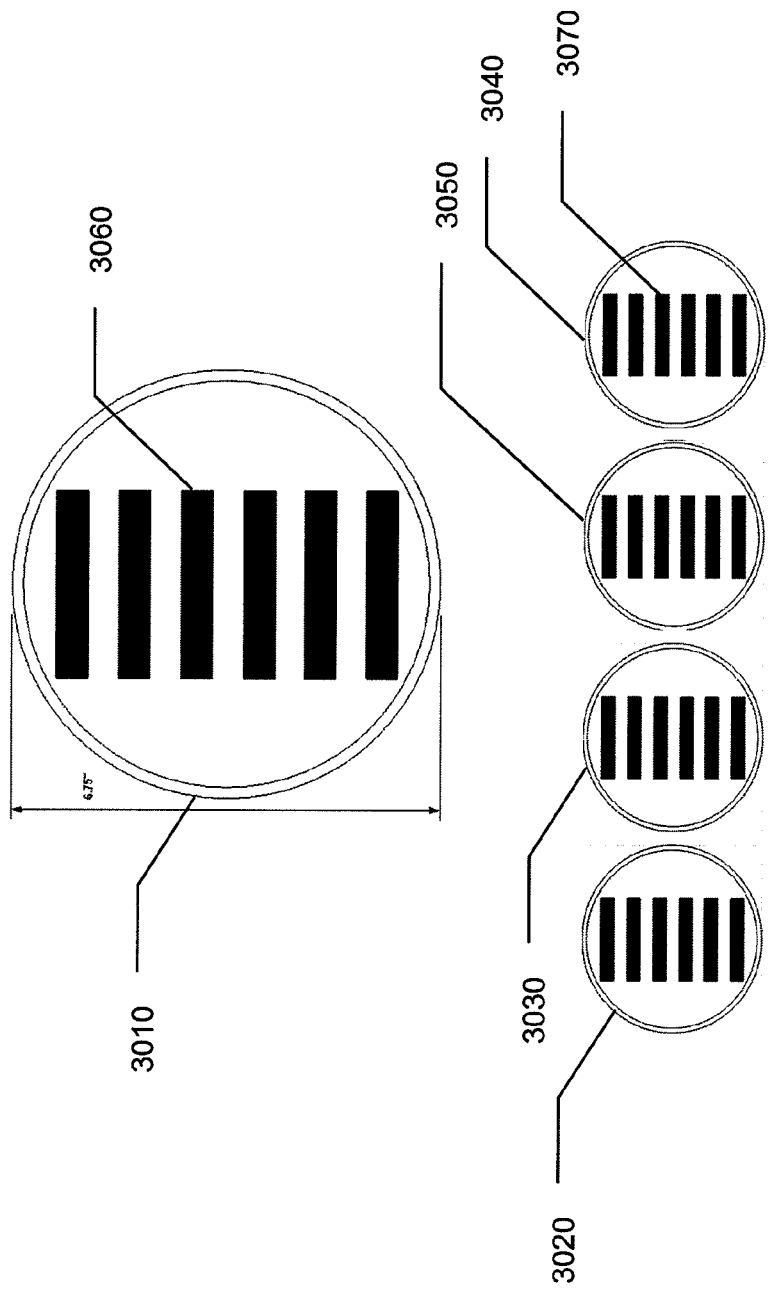
FIG. 3a depicts another embodiment of a variation of a monolithic FPA replacement solution as described herein.

FIG. 3a shows an embodiment of an array FPA as described herein. As shown, an array FPA 3060 may be positioned within a dewar 3010. An array of FPA-bearing dewars 3020, 3030, 3050, 3040 may then be arranged to share a common single-axis reflective element (not shown) for image data collection as discussed above with respect to FIG. 2d.

In some variations, the individual SCA strips in an array FPA 3070 may themselves be composed of smaller individual SCA elements arranged in a lengthwise array layout. Such a variation is shown in FIG. 3b. In such a variation, an FPA array strip 3090 may be made of individual, closely-spaced SCA elements 3080. Further variations may employ small-element arrays in various formations. Such a variation is shown in FIG. 3c.

In FIG. 3c, the dewar or other cooling enclosure 3110 may be filled with an array of staggered or spaced individual SCA elements 3120 to create an n×n element array. The SCA elements may be arranged into staggered rows 3130 that have both a vertical and horizontal offset, or may be arranged anywhere 3140 within the cooling enclosure 3110 to create particular imaging patterns or to allow for particular step-stare approaches or variations thereon.

Yet further variations may include sparse array FPAs that are configured to work with stepping or painting-in operations in two dimensions. Such a variation is shown in FIG. 3d. In FIG. 3d, the dewar or other cooling enclosure 3210 may be filled with a sparse array of spaced individual SCA elements 3220 to create an n×m element array having regularly spaced rows 3230 and columns 3240. Such a sparse array may require stepping in both the array row and column directions in order to fill gaps in the image data collected by the individual SCA elements 3220. Advantages of such a sparse array include significantly reduced cost and reduced image acquisition time due to the size of the individual SCA elements.

A step-stare pattern for such a sparse array FPA may include not only individual small steps alternating with large steps in a single axis, as shown in FIG. 2b, but may include a series of small steps in one or two axes as shown in FIG. 3e. In the pattern shown, an initial position 3310 of sparse array elements may be stepped either in a first axis 3320 or a second axis 3330. In one variation, starting at an initial position 3310, a step in a first axis direction 3360 may be followed by a step in a second axis direction 3350 and then a step in a different direction 3340 in the first axis. In some variations, the last small step 3340 may be followed by a large step 3370 in one or both axes to create a new initial position 3310 for subsequent small-step operations.

Some variations of stepping approaches may employ a number and arrangement or sequence of steps intended to cause the overall area imaged by an individual SCA element to overlap at least partially with the overall area imaged by at least one adjacent SCA element. Some variations of steps may be configured to cause self-overlap, other variations of steps may be configured to image directly adjacent SCA-sized areas.

In further variations, different types of single-axis or multi-axis multi-step image acquisition patterns may be employed. Depending on array layout, sparseness, FOR requirements, and potential other application-related or usage-related factors, the number, sequence, and direction of small and large steps may be varied as needed or desired to paint-in gaps in the array.

Figure 3F:
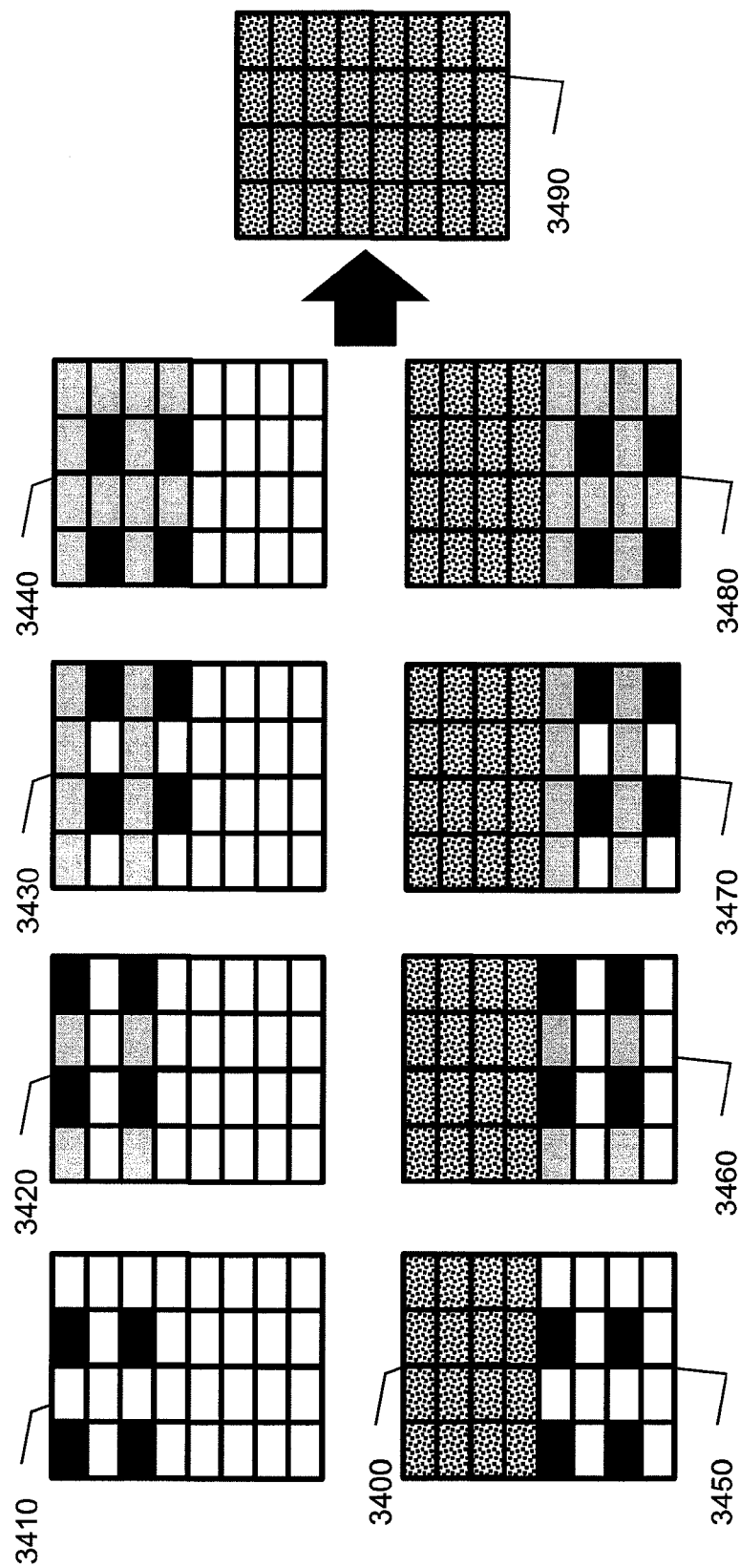
FIG. 3f depicts another example of a step-stare imaging approach as described herein.

A variation of a multi-axis multi-step image acquisition pattern associated with a two-dimensional SCA array is shown in FIG. 3f. In the variation shown, an initial position of an SCA array 3410 captures a first set of image data of a portion of an overall scene to be imaged. The FOV of the SCA array is then adjusted by a small step along a first axis 3420 to capture a second set of image data. The FOV of the SCA array is then adjusted by a small step along in a second axis 3430 to capture a third set of image data and then once more by a small step along the first axis 3440 to capture a fourth set of image data. The image data sets are combined to generate a first image portion 3400.

After completing the series of small steps 3410, 3420, 3430, 3440, the FOV of the SCA array is adjusted by a large step 3450 to being small-step imaging 3460, 3470, 3480 of a subsequent portion of the overall scene to be imaged. The small-step imaging results in a second image portion that is combined with the first image portion to create an image of the overall scene 3490. The FOV of the SCA array is then re-set and the small-step, large-step imaging sequence is carried out for a subsequent overall scene.

Figure 3G:
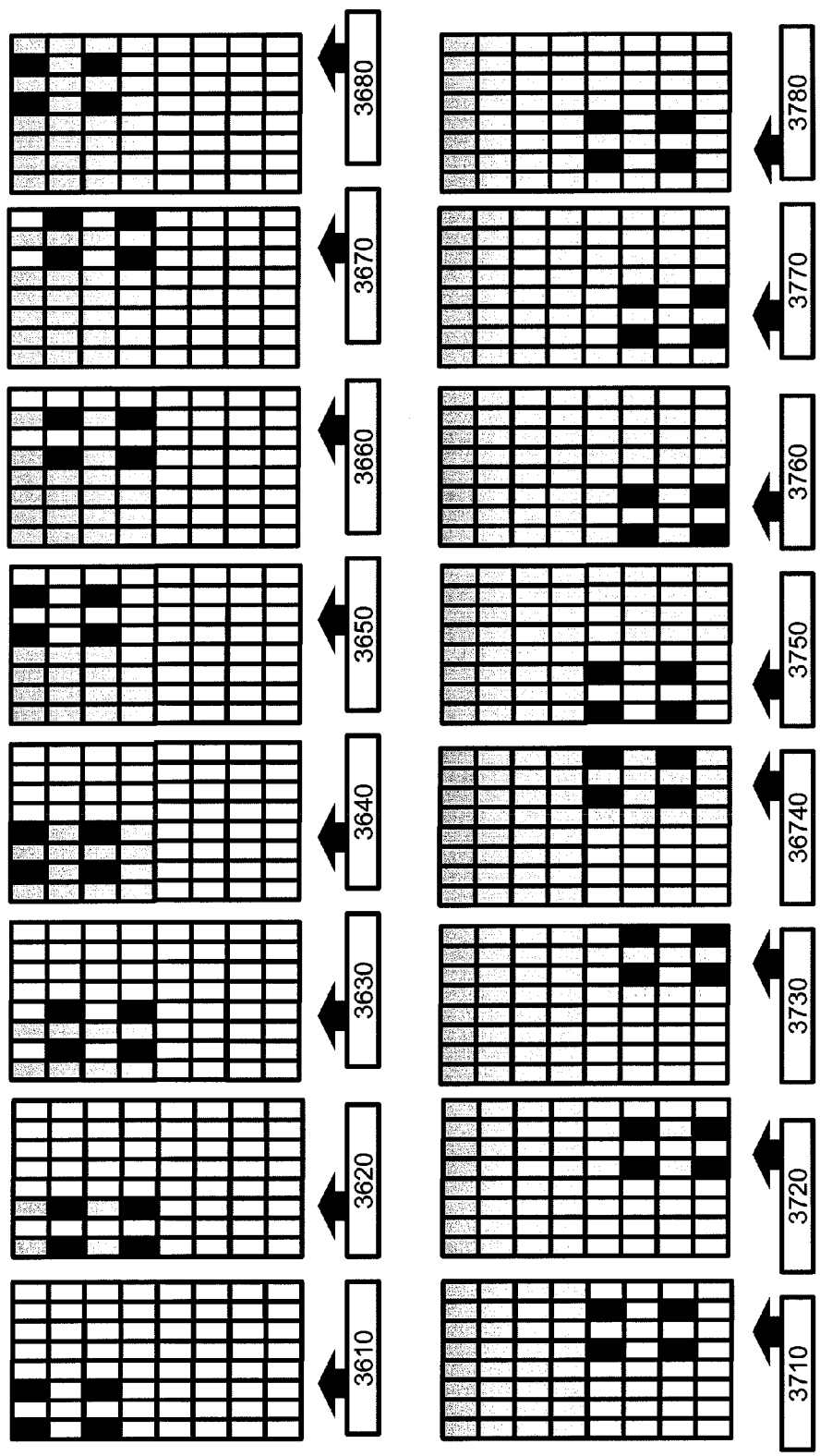
FIG. 3g depicts another example of a step-stare imaging approach as described herein.

The particular order and sequence of axis directions in FIG. 3f is meant to be illustrative and not limiting. Other variations may employ two or more steps in a particular axis direction, and may vary the order, timing, and direction of small and large steps based on SCA array layout and size, and characteristics of the scenes to be imaged and the particular requirements of the imaging application. A more complicated variation of a step-stare pattern is depicted in FIG. 3g.

In the variation shown, an SCA array starting at an initial position relative to an overall scene 3610 may go through multi-axis, multi-direction small steps 3620, 3630, 3640 to cover a scene portion (in this case a quadrant). Such a small step sequence may be followed by a large step along a first axis 3650 to a new initial position in a subsequent scene portion (in this case the next quadrant) which is imaged using another multi-axis, multi-direction sequence of small steps 3660, 3670, 3680.

In some variations, such a small step sequence may then be followed by a large step along a second axis 3710 to a subsequent initial position in a subsequent scene portion (in this case the next quadrant) where another small step sequence 3720, 3730, 3740 is carried out. A final large step 3750 in the first axis direction and a final small step sequence 3760, 3770, 3780 may complete the step-stare imaging sequence. The individual image portions may be combined into an overall image of the scene, and the FOV of the SCA array may be re-set to image a subsequent scene.

A variation using multiple small steps in an axis direction is shown in FIG. 3h. FIG. 3h depicts only the small step operations, but such a sequence, or variations thereof, may readily be applied to large step operations as well. The sequence shown is for a sparse SCA array and requires two small steps 3820, 3830 in one axis direction from an initial starting position 3810, followed by a small step in another axis direction 3840, two small steps 3850, 3860 along the first axis, a step along the second axis 3870, and two more steps along the first axis 3880, 3890. Other variations may include multiple steps along a first axis followed by multiple steps along a second axis. Yet further variations may vary small step and large step numbers, axes, and axis directions in many ways depending on SCA array shape, density, size, and the requirements of the imaging application.

The concept being thus described, it will be obvious that the same may be varied in many ways. Such variations are not to be regarded as departure from the spirit and scope of the concept, and all such modifications as would be obvious to one skilled in the art are intended to be included within the scope of the following claims.

What is claimed is:

1. A method of acquiring large field of view, high-resolution image data, the method comprising:
   providing a focal plane array (FPA) having a first sensor chip assembly (SCA) and a second SCA arranged in a spaced array on the FPA, where the first and second SCAs are the same size and resolution; and
   the first and second SCAs are aligned relative to each-other in the FPA in the spaced array with a first intentional gap between the first and second SCAs;
   first acquiring first image data of a first scene portion with the first SCA;
   second acquiring second image data of the first scene portion with the second SCA, said second acquiring being performed simultaneously with said first acquiring;
   adjusting the field of view (FOV) of the FPA after said first and second acquiring so that the first and second SCAs observe a second scene portion;
   third acquiring first image data of the second scene portion with the first SCA;
   fourth acquiring second image data of the second scene portion with the second SCA, said fourth acquiring being performed simultaneously with said third acquiring; and
   combining the first and second image data of the first scene portion and the first and second image data of the second scene portion to create image data of an overall scene.

2. The method of claim 1, the method further comprising:
   providing a third SCA in the spaced array of the FPA, the third SCA being aligned relative to the first SCA such that there is a second intentional gap the first and third SCAs;
      fifth acquiring third image data of the first scene portion with the third SCA, said fifth acquiring being performed simultaneously with said first and second acquiring; and
      sixth acquiring third image data of the second scene portion with the third SCA said fifth acquiring being performed simultaneously with said third and fourth acquiring; and
      combining third image data for the first and second scene portions into the image data of the overall scene.

3. The method of claim 1, where adjusting the FOV includes moving the FOV along a first axis by an amount less than the size of the first SCA along the first axis.

4. The method of claim 3, wherein there is no SCA in the first intentional gap;
the first intentional gap is along the first axis; and
said third acquiring acquires image data of a the first scene portion that was not acquired during said first or second acquiring due to the first intentional gap.

5. The method of claim 4, where the first intentional gap is larger than the size of the first SCA along the first axis.

6. The method of claim 4, the method further comprising simultaneously reading out acquired image data from the first and second SCAs during said adjusting.

7. The method of claim 3, the method further comprising:
second adjusting the FOV after said third and fourth acquiring steps by moving the FOV along a second axis so that the first and second SCAs observe a third scene portion;
seventh acquiring first image data of the third scene portion with the first SCA;
eighth acquiring second image data of the third scene portion with the second SCA, said eighth acquiring being performed simultaneously with said seventh acquiring; and
combining the first and second image data of the third scene portion into the image data of an overall scene;
where said moving the FOV along the first axis and said moving the FOV along the second axis both include moving the FOV by an amount less than a size of the first SCA along the axis of movement.

8. The method of claim 1, the method further comprising third adjusting the FOV after said third and fourth acquiring steps by moving the FOV along the first axis by an amount at larger than the size of the first SCA and smaller than a size of the spaced array.

9. The method of claim 2, where the first, second, and third SCAs are all aligned along a common axis in the spaced array and where the first and second intentional gaps are the same size.

10. The method of claim 4, where the first axis extends through the center of the first and second SCAs.

11. A system for acquiring large field of view, high-resolution image data, the system comprising:
a first sensor chip assembly (SCA) arranged on a focal plane array (FPA), said first SCA having a size and a resolution and being configured to perform image acquisition;
a second SCA arranged on the FPA, said second SCA having the same size and resolution as the first SCA and being configured to perform image acquisition simultaneously with the first SCA; a
a field of view (FOV) adjustment device that moves the FOV of the FPA so that it can observe different scenes; and
read-out hardware configured to read-out and combine image data from the first and second SCAs into a combined image;
where the first and second SCAs are arranged relative to each-other in a first spaced array extending along a first dimension of the FPA such that there is a first intentional gap between the first and second FPAs along the first dimension.

12. The system of claim 11, where the FOV adjustment device includes an actuated electro-optical element that rotates about an axis and directs incoming electro-optical radiation onto the FPA.

13. The system of claim 11, the system further including a third SCA arranged on the FPA, the third SCA being configured to perform image acquisition simultaneously with the first SCA;
where the spaced array is a two-dimensional array and the third SCA is arranged in the spaced array extending along a second dimension of the FPA such that there is a second intentional gap between the third and first SCAs along the second dimension.

14. The system of claim 11, the system further including a third SCA arranged on the FPA, the third SCA being configured to perform image acquisition simultaneously with the first SCA;
where the third SCA is arranged in the first spaced array such that there is a third intentional gap between the third and second FPAs along the dimension of array extent; and
where the third SCA has the same size and resolution as the first SCA.

15. The system of claim 12, where the actuated electro-optical element is a rapid-stepping one-axis mirror.

16. The system of claim 11, where the first intentional gap is smaller than the size of the first SCA along the first dimension.

17. The system of claim 11, the system further comprising a fourth SCA arranged on the FPA and a fifth SCA arranged on the FPA, said fourth SCA and fifth SCA both being configured to perform image acquisition simultaneously with the first SCA;
where the fourth and fifth FPAs are aligned relative to each-other in a second spaced array extending along the first dimension such that there is a fourth intentional gap between the fourth and fifth FPAs along the first dimension; and
where the second spaced array is distinct from and adjacent to the first spaced array.

18. The system of claim 17, where the FOV adjustment device includes a first FOV adjuster sub-unit and a second FOV adjuster sub-unit;
where the first adjuster sub-unit adjusts the FOV of the first spaced array, the second adjuster sub-unit adjusts the FOV of the second spaced array, and the first and second adjuster sub-units are independently operable.

19. The system of claim 11, where the FOV adjustment device is configured to move the FOV of the FPA in small steps and large steps, where a small step is smaller than the size of the first SCA in a direction of movement and a large step is larger than the size of the first SCA but smaller than the first spaced array.

20. The system of claim 13, where the FOV adjustment device is configured to move the FOV of the FPA in at least two axis directions.

21. The system of claim 12, where the electro-optical element is a refractive element.

22. The system of claim 13, where the spaced array includes a plurality of SCAs having the same length, width, and resolution and where said plurality of SCAs are arranged such that there is a first dimension intentional gap between each SCA in the first dimension and a second dimension intentional gap between each SCA in the second dimension.

23. The system of claim 11, where the FOV adjustment device is configured to move the FOV of the FPA such that after a first image acquisition operation associated with a first scene, the FOV of the FPA is moved so that in a second image acquisition operation, at least one SCA images those portions of the first scene associated with the intentional gap during the first image acquisition operation.

24. The system of claim 20, where the FOV adjustment device includes a stepped, single-axis mirror that rotates around a first axis and a mirror housing that rotates around a second axis perpendicular to the first axis.

25. The system of claim 19, where:

there is no SCA in the first intentional gap;

the FOV adjustment device is configured to move the FOV of the FPA along the first dimension such that an image acquisition operation by the first SCA after a small step acquires image data previously omitted by the first and second SCAs due to the first intentional gap; and the system further includes an image combination unit that combines the image data acquired before the small step with image data acquired after the small step into a cohesive image.

26. The system of claim 25, where an axis of movement of the FOV along the first dimension extends through the centers of the first and second SCAs.

* * * * *